(12) United States Patent
Haulick et al.

(10) Patent No.: US 12,175,970 B2
(45) Date of Patent: Dec. 24, 2024

(54) SPEECH DIALOG SYSTEM FOR MULTIPLE PASSENGERS IN A CAR

(71) Applicant: Cerence Operating Company, Burlington, MA (US)

(72) Inventors: Tim Haulick, Ulm (DE); Slawek Jarosz, Montreal (CA); Bart D'hoore, Merelbeke (BE); Markus Buck, Ulm (DE); Stefan Hamerich, Ulm (DE)

(73) Assignee: Cerence Operating Company, Burlington, MA (US)

( * ) Notice: Subject to any disclaimer, the term of this patent is extended or adjusted under 35 U.S.C. 154(b) by 452 days.

(21) Appl. No.: 17/133,718

(22) Filed: Dec. 24, 2020

(65) Prior Publication Data

US 2022/0208185 A1 Jun. 30, 2022

(51) Int. Cl.
| | |
|---|---|
| G10L 15/22 | (2006.01) |
| B60K 35/10 | (2024.01) |
| B60K 35/60 | (2024.01) |
| G10L 15/20 | (2006.01) |
| G10L 17/14 | (2013.01) |
| G10L 21/0208 | (2013.01) |
| G10L 21/0216 | (2013.01) |
| H04R 3/00 | (2006.01) |

(52) U.S. Cl.
CPC .............. G10L 15/22 (2013.01); B60K 35/60 (2024.01); G10L 15/20 (2013.01); G10L 17/14 (2013.01); H04R 3/005 (2013.01); B60K 35/10 (2024.01); B60K 2360/148 (2024.01); G10L 2015/223 (2013.01); G10L 2021/02087 (2013.01); G10L 2021/02166 (2013.01)

(58) Field of Classification Search
CPC ......... G10L 15/22; G10L 15/08; G10L 15/20; G10L 17/14; G10L 2015/223; G10L 2021/02087; G10L 2021/02166; H04R 3/005; H04R 1/406; B60K 37/02; B60K 2370/148

See application file for complete search history.

(56) References Cited

U.S. PATENT DOCUMENTS

| | | | | |
|---|---|---|---|---|
| 5,055,939 A | * | 10/1991 | Karamon | G11B 27/10 386/338 |
| 6,243,683 B1 | * | 6/2001 | Peters | G10L 15/24 704/273 |
| 6,567,775 B1 | * | 5/2003 | Maali | G06V 20/40 704/231 |
| 7,472,063 B2 | * | 12/2008 | Nefian | G06F 18/256 704/256.1 |
| 7,957,542 B2 | * | 6/2011 | Sarrukh | G10K 11/341 704/226 |

(Continued)

FOREIGN PATENT DOCUMENTS

| | | | | | |
|---|---|---|---|---|---|
| DE | 202017106586 U1 | * | 7/2018 | ......... | G06K 9/00255 |
| JP | 2004045616 A | * | 2/2004 | ............ | G10L 15/25 |
| WO | WO-2017138934 A1 | * | 8/2017 | ............ | G10L 15/08 |

*Primary Examiner* — Mohammad K Islam
(74) *Attorney, Agent, or Firm* — Occhiuti & Rohlicek LLP

(57) ABSTRACT

An automotive assistant that is connected to microphones and loudspeakers that are associated with different seats in a passenger vehicle includes a dialog manager that is configured to initiate a dialog based on an utterance received at a first one of the microphones and to advance that dialog based on an utterance received from another of the microphones.

17 Claims, 3 Drawing Sheets

(56) References Cited

U.S. PATENT DOCUMENTS

| | | | |
|---|---|---|---|
| 8,700,392 B1* | 4/2014 | Hart | G10L 15/25 704/231 |
| 8,913,103 B1* | 12/2014 | Sargin | G06V 40/16 348/14.12 |
| 9,832,583 B2* | 11/2017 | Cohen | H04M 3/568 |
| 9,881,610 B2* | 1/2018 | Connell, II | G10L 15/25 |
| 9,922,646 B1* | 3/2018 | Blanksteen | G06F 3/167 |
| 10,154,361 B2* | 12/2018 | Tammi | H04S 7/30 |
| 10,332,515 B2* | 6/2019 | Kim | G10L 25/78 |
| 10,374,816 B1* | 8/2019 | Leblang | H04L 12/1822 |
| 11,256,475 B2* | 2/2022 | Ito | G01C 21/3608 |
| 2004/0220705 A1* | 11/2004 | Basir | B60R 21/01538 701/1 |
| 2009/0015651 A1* | 1/2009 | Togami | G10L 21/00 348/14.01 |
| 2009/0055180 A1* | 2/2009 | Coon | B60R 16/0373 704/251 |
| 2009/0150149 A1* | 6/2009 | Culter | G06F 18/256 704/201 |
| 2010/0194863 A1* | 8/2010 | Lopes | G06T 7/12 715/848 |
| 2010/0265164 A1* | 10/2010 | Okuno | H04S 7/304 345/8 |
| 2011/0224978 A1* | 9/2011 | Sawada | G06V 40/16 704/E15.001 |
| 2012/0069131 A1* | 3/2012 | Abelow | G06Q 30/0601 345/589 |
| 2013/0030811 A1* | 1/2013 | Olleon | B60K 35/00 348/148 |
| 2013/0169801 A1* | 7/2013 | Martin | G06T 7/80 348/222.1 |
| 2014/0187219 A1* | 7/2014 | Yang | H04W 4/023 455/418 |
| 2014/0214424 A1* | 7/2014 | Wang | G06V 40/172 704/246 |
| 2014/0365228 A1* | 12/2014 | Ng-Thow-Hing | G06F 3/017 704/275 |
| 2014/0372100 A1* | 12/2014 | Jeong | G06T 13/40 704/2 |
| 2015/0023256 A1* | 1/2015 | Liu | H04W 4/40 370/329 |
| 2015/0058004 A1* | 2/2015 | Dimitriadis | G10L 25/78 704/233 |
| 2015/0139426 A1* | 5/2015 | Tammi | H04R 3/005 381/17 |
| 2015/0154957 A1* | 6/2015 | Nakadai | G10L 15/26 704/235 |
| 2015/0254058 A1* | 9/2015 | Klein | G10L 15/22 704/275 |
| 2015/0324636 A1* | 11/2015 | Bentley | A63F 13/212 386/227 |
| 2015/0340040 A1* | 11/2015 | Mun | G10L 17/22 704/246 |
| 2016/0064000 A1* | 3/2016 | Mizumoto | G10L 15/22 704/233 |
| 2016/0100092 A1* | 4/2016 | Bohac | H04N 7/188 382/103 |
| 2016/0140964 A1* | 5/2016 | Connell | G10L 15/07 704/231 |
| 2016/0358604 A1* | 12/2016 | Dreuw | G10L 15/22 |
| 2017/0113627 A1* | 4/2017 | Ding | B60R 1/12 |
| 2017/0133036 A1* | 5/2017 | Cohen | H04N 7/147 |
| 2017/0309275 A1* | 10/2017 | Takayanagi | G10L 15/32 |
| 2017/0309289 A1* | 10/2017 | Eronen | H04R 1/406 |
| 2017/0351485 A1* | 12/2017 | Kohler | G06F 3/165 |
| 2018/0018964 A1* | 1/2018 | Reilly | G10L 15/02 |
| 2018/0033447 A1* | 2/2018 | Ramprashad | G10L 25/21 |
| 2018/0077492 A1* | 3/2018 | Yamada | H04R 3/12 |
| 2018/0174583 A1* | 6/2018 | Zhao | G10L 25/78 |
| 2018/0190282 A1* | 7/2018 | Mohammad | G10K 11/178 |
| 2018/0233147 A1* | 8/2018 | Tukka | G10L 15/1815 |
| 2018/0286404 A1* | 10/2018 | Cech | G06T 7/254 |
| 2019/0005412 A1* | 1/2019 | Matus | G07C 5/085 |
| 2019/0037363 A1* | 1/2019 | Tzirkel-Hancock | H04W 4/48 |
| 2019/0073999 A1* | 3/2019 | Prémont | G10L 15/08 |
| 2019/0237067 A1* | 8/2019 | Friedman | G10L 15/08 |
| 2019/0333508 A1* | 10/2019 | Rao | G10L 15/25 |
| 2019/0355352 A1* | 11/2019 | Kane | G06V 20/59 |
| 2019/0392826 A1* | 12/2019 | Lee | G10L 15/22 |
| 2019/0394339 A1* | 12/2019 | Seo | H04R 1/1083 |
| 2020/0216082 A1* | 7/2020 | Amir | G05B 13/0265 |
| 2021/0200811 A1* | 7/2021 | Krishnamurthi | H04N 7/157 |
| 2021/0201903 A1* | 7/2021 | Yoshinaga | B60K 35/265 |
| 2022/0076670 A1* | 3/2022 | Marti | G06F 3/167 |
| 2023/0325146 A1* | 10/2023 | Mistry | G10L 17/22 715/706 |

\* cited by examiner

SPEECH DIALOG SYSTEM FOR MULTIPLE PASSENGERS IN A CAR

BACKGROUND

This invention relates to system for facilitating voice interaction between an automotive assistant and passengers in a passenger vehicle.

In a typical passenger vehicle, the passengers who sit in the front seat do so with their backs towards passengers in the rear. In addition, when the car is moving, a significant amount of road noise arises. At high speed, wind noise also arises. It is therefore not surprising that, although the passengers find themselves sitting close to each other, a passenger vehicle is not a place that is conducive to conversation.

A modern passenger vehicle includes a loudspeaker and microphone associated with each seat. These are available for use by a variety of systems. Examples of such systems include an entertainment system, which plays audio content through the loudspeakers, a hands-free telephony system, which uses both the microphone and speakers in connection with making a telephone call, and an in-car communication system, which uses the loudspeakers and microphones to promote communication between passengers.

Because of the close quarters within a passenger vehicle, a microphone assigned to receive speech from a passenger may find itself receiving speech from other passengers. The resultant acoustic cross-coupling hinders communication between passengers.

Based on the multiple microphone signals, multi-channel signal processing rids each microphone signal of such acoustic cross-coupling. As a result, it is possible to isolate the speech signals for each passenger. Among these signal processing methods are those that rely on spatial separation methods, such as beamforming. Others reply on source separation methods. The net result is a set of acoustic signals, each of which includes primarily only the speech signal of one passenger. Each such signal thus corresponds to one seat or acoustic zone.

In addition to being used to communicate with other passengers, such a system can also be used to carry out a dialog with an automotive assistant. To initiate a dialog, a passenger speaks a wake-up word or an activation phrase to obtain the automotive assistant's attention. That passenger then follows with a suitable speech command. In some systems, a passenger initiates a dialog with an automotive assistant by directly uttering a speech command.

Having had its attention captured by a particular passenger, the automotive assistant continues its dialog with that passenger. In the course of doing so, the automotive assistant directs its full attention to that passenger, ignoring any stray utterances by other passengers. It does so by using signal processing methods already described above. By ignoring such stray utterances, the automotive assistant avoids the difficulties that arise from any interfering signals. This tends to increase the dialog's robustness. The automotive assistant assumes that whoever initiated the dialog is the relevant speaker for that dialog; all other passengers are irrelevant.

Yet another advantage is that other passengers are free to conduct their own conversations with each other, free of being concerned with interfering with the ongoing dialog.

SUMMARY

A difficulty that arises when engaging in a dialog with an automotive assistant is that other passengers cannot influence or contribute to the dialog. Thus, it is not possible for other passengers to contribute to the dialog, for example by adding a topic or clarifying some point. It is also not possible for another passenger, who did not initiate the dialog, to completely take over the dialog.

To overcome the foregoing difficulty, it is useful to have, for each seat, a seat-specific speech daemon. Such a speech daemon includes one or both of an automatic speech-recognition unit and a natural-language understanding unit.

Like any daemon, the seat-specific speech daemon is activated at all times. The speech daemon thus provides an analysis for any utterance that is spoken from any seat in the car. This permits the automotive assistant to distinguish between passengers who seek to contribute to an ongoing dialog and passengers who are having conversations that are irrelevant to the dialog. Such conversations include conversations with each other and telephone conversations. Accordingly, the seat-specific speech daemon provides preliminary information concerning the utterance, including whether the utterance is likely to have been addressed to the automotive assistant at all.

In one aspect, the invention features an automotive assistant that is configured to receive first and second microphone signals from first and second microphones disposed in corresponding first and second acoustic zones of a vehicle. The first and second microphone signals carry first and second utterances from corresponding first and second passengers of the vehicle. The automotive assistant includes a dialog manager that is configured to initiate a dialog with the first passenger based on the first utterance and to advance the dialog based on the second utterance.

Some embodiments also include a reasoning stage that is configured to infer relevance of the second utterance to the dialog.

Among these are embodiments in which the reasoning stage infers whether the second utterance is intended to initiate a second dialog that differs from the first dialog.

In other embodiments, the dialog manager is configured to manage the dialog and another dialog that is being carried out concurrently or in parallel with the first dialog.

Still other embodiments include speech daemons, each of which monitors an acoustic signal that has been derived from a corresponding microphone signal. In either case, the speech daemon is configured to extract, from the second acoustic signal, information relevant to determining whether the second utterance is intended to advance the dialog.

Further embodiments include plural natural-language processors that are configured to execute while the dialog manager is managing the dialog. Each natural-language processor is configured to receive an acoustic signal derived from one of the microphones and to extract, from the acoustic signal, information indicative of relevance of the acoustic signal to the dialog.

Among the embodiments that include speech daemons that monitor an acoustic signal derived from one of the microphones are those in which each speech daemon includes a wake-word detector, a natural-language processor, and an automatic speech-recognizer.

Also, among the embodiments are those that include an isolator configured to receive a microphone signal from the first microphone. The microphone signal includes a superposition of first and second utterances. The first utterance is an utterance from an intrinsic speaker for the first microphone and the second utterance is an utterance from an extrinsic speaker for the microphone. The isolator is configured to output an acoustic signal corresponding to the microphone signal. The output microphone signal is one in which the extrinsic speaker has been suppressed. Embodiments include those in which the isolator implements a digital signal processing algorithm. Examples of such algorithms include those that carry out beamforming and those that carry out source separation.

Among the foregoing embodiments are those in which a first power ratio is a ratio of power in the first utterance relative to power in the second utterance in the microphone signal and a second power ratio is a ratio of power in the first utterance to power in the second utterance in the acoustic signal. The two power ratios are such as to indicate that the second utterance has been suppressed in the acoustic signal.

In some embodiments, the automotive assistant is further configured to receive first and second camera signals from first and second cameras disposed in the first and second acoustic zones, respectively. In such embodiments, the automotive assistant is configured to determine relevance of the second utterance to the dialog based at least in part on information provided by the second camera.

Also, among the embodiments are those in which the automotive assistant is connected to loudspeakers disposed in different acoustic zones respectively. In such embodiments, the dialog manager is configured to advance the dialog by providing a distribution signal that causes a loudspeaker signal to be provided to a proper subset of the loudspeakers.

In still other embodiments, the automotive assistant is configured to be pre-set to a state in which an utterance from one of the first and second microphones is ignored.

In other embodiments, the automotive assistant is connected to loudspeakers, each of which is disposed in a different acoustic zone of the vehicle and a distributor distributes a loudspeaker signal to selected ones of the loudspeakers.

Still other embodiments are those in which the automotive assistant includes a text-to-speech converter that coverts a digital signal representative of speech that advances the dialog into an audio signal to be provided to loudspeakers in the vehicle.

Further embodiments include those in which each of the acoustic zones corresponds to a seat in the vehicle.

In another aspect, the invention features a method that includes detecting a wake word, initiating a dialog based on a first utterance from a first zone, thereby establishing a first dialog, receiving a second utterance from a second zone, using a natural-language processor, determining that the second utterance advances the first running dialog, and continuing the running dialog based on the second utterance.

Among the practices of such a method are those that also include receiving a third utterance. In such cases, the natural-language processor is used to determine whether or not the third utterance is irrelevant to the dialog. If so, then the third utterance is ignored. Otherwise, the third utterance is used to advance the dialog. In some of the foregoing practices, the third utterance is further analyzed to see if it manifests an intent to start another dialog. In such cases, a new dialog is started. As a result, there are two dialogs executing in parallel and concurrently.

Among those practices that include two concurrent dialogs, i.e., a first and second dialog, are those that include receiving an utterance and determining that that received utterance is irrelevant to the first dialog but relevant to the second dialog. Among these practices are those that include advancing the second dialog based on the fourth utterance.

In another aspect, the invention features a method that includes, based on a first utterance from a first zone, establishing a first dialog, receiving a second utterance from a second zone, using a reasoning stage, determining a property of the second utterance, wherein the property is selected from the group consisting of the property of advancing the dialog and the property of not advancing the dialog.

Among the practices of the method are those in which determining the property includes determining that the second utterance has the property of not advancing the dialog and ignoring the second utterance.

Also among the practices are those in which determining the property includes determining that the second utterance has the property of advancing the dialog and advancing the dialog based on the second utterance.

In other practices, determining the property includes determining that the second utterance has the property of not advancing the dialog. Such practices further include determining that the second utterance is an attempt to initiate a new dialog and starting the new dialog based on the second utterance.

For convenience in exposition, the term "passenger," as used herein, includes the driver of the passenger vehicle.

The method and apparatus as described and claimed herein are non-abstract. No description has been offered of any abstract implementations. Accordingly, the claims are to be construed as covering only non-abstract subject matter. Any person who construes them otherwise would, by definition, be construing them incorrectly and without regard to the specification.

The processing system that executes the method is not a generic computer. It is a specialized digital electronic device that is specially adapted for operation in a passenger vehicle to accommodate the various technical constraints imposed by that environment including limited space and power and operation in environments of extreme heat or cold and resistance to shock and other forces that result from acceleration.

Additionally, though it is convenient to implement the method using software instructions, it is known that virtually any set of software instructions can be implemented by specially designed hardware, which is typically provided as an application-specific integrated circuit. The claims presented herein are also intended to cover such an implementation.

These and other features will be apparent from the following detailed descriptions and the accompanying drawings, in which:

DETAILED DESCRIPTION

Figure 1:
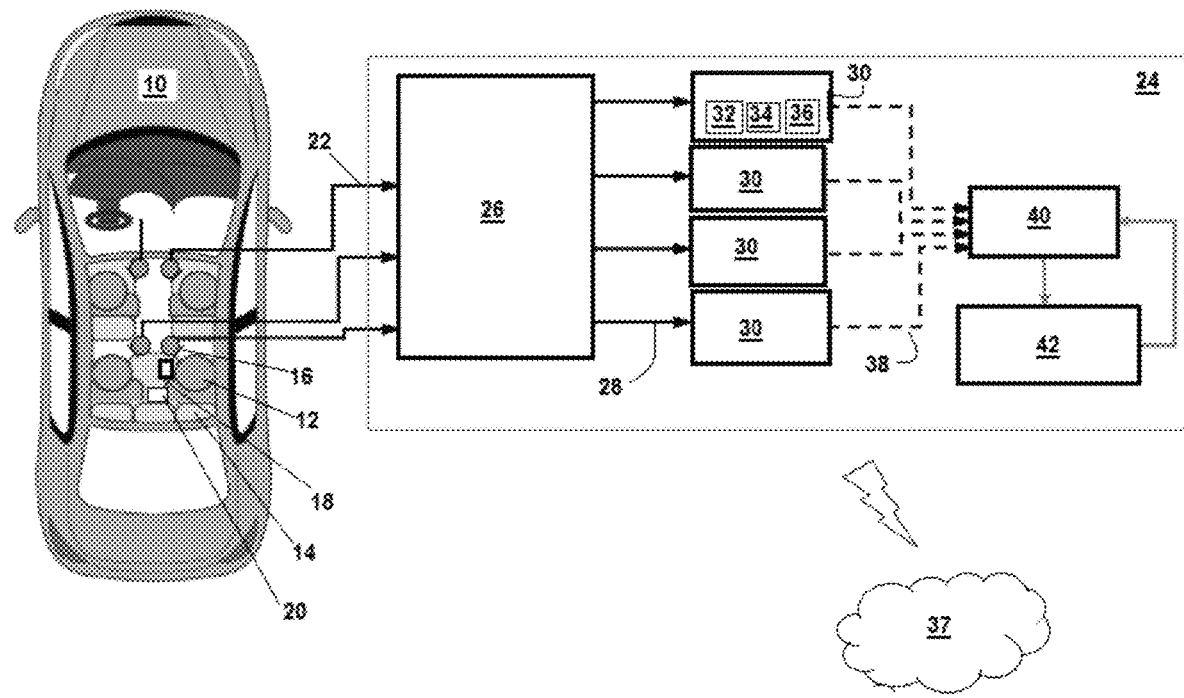
FIG. 1 shows a vehicle equipped with an automotive assistant that communicates with passengers through microphones and speakers located at the seats of each passenger.

FIG. 1 shows a passenger vehicle 10 having seats 14 for carrying passengers 12. Each seat 14 has an associated microphone 16 and an associated loudspeaker 18 for communication with the passenger 12. Each seat 14 also has an associated camera 20 trained towards the passenger 12 for observation of the passenger's gaze direction and gestures.

For convenience of exposition, the passenger 12 seated at a seat 14 associated with a particular microphone 16 is said to be the intrinsic speaker for that microphone 16. All other speakers are said to extrinsic speakers for that microphone 16. The vehicle's passenger cabin is thus partitioned into acoustic zones. Each passenger 12 is an intrinsic speaker within one of the acoustic zones and an extrinsic speaker in all other acoustic zones.

The microphone 16 provides a microphone signal 22 to an automotive assistant 24. The microphone signal 22 potentially includes signals representative of utterances extrinsic speakers.

An isolator 26 within the automotive assistant 24 receives the microphone signals 22 from all passengers 16 and carries out multi-channel signal processing for speaker separation. After having done so, the isolator 26 outputs, for each incoming microphone signal 22, a corresponding acoustic signal 28. The acoustic signal 28 corresponding to a particular microphone signal 22 is one in which utterances by extrinsic speakers have been suppressed. As a result, the acoustic signal 28 is dominated by the utterances of that microphone's intrinsic speaker. More precisely, the microphone signal 22 carries a superposition of a first component and a second component. The first component is a signal from the intrinsic speaker. The second component is the superposition of signals from all extrinsic speakers. A ratio between power associated with the first and second components. The isolator 26 causes that ratio to favor the first component.

The acoustic signal 28 is said to be "acoustic" not because it is carried by a sound wave but because it occupies a frequency band consistent with human speech.

The automotive assistant 24 further includes speech daemons 30, each of which receives a corresponding one of the acoustic signals 28. Because it is constantly executing, the speech daemon 30 constantly listens for utterances by the intrinsic speaker associated with its corresponding microphone 16.

The speech daemon 30 comprises one or more of a wake-word detector 32, an automatic speech-recognizer 34, and a natural-language processor 36. Each speech daemon 30 receives a separate one of the acoustic signals 28. As a result, each speech daemon 30 provides results separately from speech daemons 30 associated with other seats 14. The speech daemons 30 thus operate in parallel.

The speech daemons 30 provide their respective analysis outputs 38 to a reasoning stage 40. The reasoning stage 40 decides which analysis outputs 38 are relevant to an ongoing dialog being managed by a dialog manager 42. The reasoning stage 40 then provides those relevant utterances to the dialog manager 42.

Based on the acoustic signal 28, the automatic speech recognizer 34 converts the incoming audio into a string of words. It also extracts features that are useful for determining whether the incoming audio is speech, and whether the resulting string of words could potentially represent a command. In some embodiments, system pre-sets cause the automatic speech recognizer 34 to ignore utterances from particular microphones 16. For example, if the vehicle 10 is being used to ferry particularly rambunctious children in the rear seat, it may be useful to cause the automatic speech recognizer 34 to consider only utterances from microphones 16 in the front seat.

In operation, each automatic speech recognizer 34 provides a string of words to its associated natural-language processors 36. The natural-language processor 36 carries out a preliminary interpretation to decide whether the string of words represents a command.

In general, there are two kinds of commands: a first type, which can be interpreted locally by the natural-language processor 36 itself, and a second type, which is interpreted remotely, for example by a cloud-based external assistant 37. The natural-language processor 36 carries out enough processing to classify the utterance as one or the other.

For commands of the first type, the natural language processor 36 converts the command into a semantic interpretation that manifests one or more intentions as well as objects that the intentions apply to. Examples of outputs provided by the natural-language processors 36 include one or more of the word sequence, information whether the utterance is out-of-scope, a zone index, and timing information, such as the starting time and ending time of a recognized utterance, and an interpretation of the audio in the form of a canonicalized intent and associated mentions.

Commands of the second type are transmitted to the external assistant 37 for processing.

The availability of seat-specific speech daemons 30 thus permits detection of spoken commands utterance in all acoustic zones.

The natural-language processors 36 provide information that the reasoning stage 40 considers when classifying an utterance as one that contributes to an ongoing dialog. Criteria that are useful to this classification include whether or not the utterance articulates an intent that is consistent with the current dialog stage context, whether utterance is one that is within the active domain, and whether or not the utterance is one that leads to a change that is related to the context of the ongoing dialog.

An example of utterances that are related in context is one that begins with a first person saying, "Drive to the Suds-and-Gristle at the Chitterling Mall." Shortly thereafter, to avoid a social gaffe, a second person utters, "Oh, don't forget to call Glinda so she can join us." Given the context of the first utterance, the natural-language processor 36 determines that the second utterance is related to the first.

An example of utterances that are unrelated in context is one that begins the same way, with a first person saying, "Drive to the Suds-and-Gristle at the Chitterling Mall." Shortly thereafter, to avoid a social gaffe, a second person utters, "Change the station to something less abrasive." Given the context of the first utterance, the natural-language processor 36 determines that the second utterance is unrelated to the first.

In some embodiments, it is useful for the natural-language processor 36 to distinguish between an interrogative statement and a verb in the imperative. Doing so provides clues on the speaker's intent to participate in an ongoing dialog. For instance, it is useful to distinguish between an utterance of the form "Should we make a reservation?" and one of the form "Reserve a table."

It is also useful for the natural-language processor 36 to assess an utterance's timing to determine whether that utterance is indicative of an intent to participate in an ongoing dialog.

In some cases, a delay in an utterance is indicative of its relevance. After all, an utterance spoken long after the most recent utterance pertaining to a dialog is unlikely to be one that is an attempt to further that dialog. To identify such lack of relevance, it is useful to provide a time-out feature.

A delay in an utterance is not the only temporal feature that provides information concerning the relevance of that utterance to an ongoing dialog. For instance, a second utterance that follows too closely on the heels of the first utterance, particularly before the intent of the first utterance has even been expressed, is one that is unlikely to further that dialog.

In some embodiments, the natural-language processors 36 assess a detected utterance for a change in passenger speaking. This is useful because it is not unreasonable to weight a speaker who has spoken the most recent utterance more highly than a speaker who has not yet contributed to an ongoing dialog. Similarly, when two speakers speak concurrently or almost concurrently, it is not unreasonable to infer that both speakers are attempting to advance the ongoing dialog.

In some embodiments, the natural-language processor 36 identifies certain negative cues as relevant to the reasoning stage's classification process. This is useful to prevent an incorrect reaction to an utterance.

Among these are embodiments in which the natural-language processor 36 recognizes a passenger's name embedded in an utterance. The presence of such a name provides a basis for inferring that the speaking passenger is not attempting to further an ongoing dialog with the automotive assistant. For example, the preceding dialog, which began with a speaker saying, "Drive to the Suds-and-Gristle at the Chitterling Mall" may instead be followed by an interrogative with an embedded name, such as: "Rachel, don't you think Glinda will be disappointed if we don't call her to join us?" The insertion of a name in this utterance would suggest that this utterance is not a system-directed utterance at all.

The negative cue need not be an audio cue. In those embodiments that include a camera 20, the reasoning stage 40 obtains a negative visual cue by observing that the speaker's gaze is directed to another passenger or by observing a gesture directed towards the perceived location of the automotive assistant 24 indicating an intent to prevent the automotive assistant 24 from acting upon the utterance.

Figure 2:
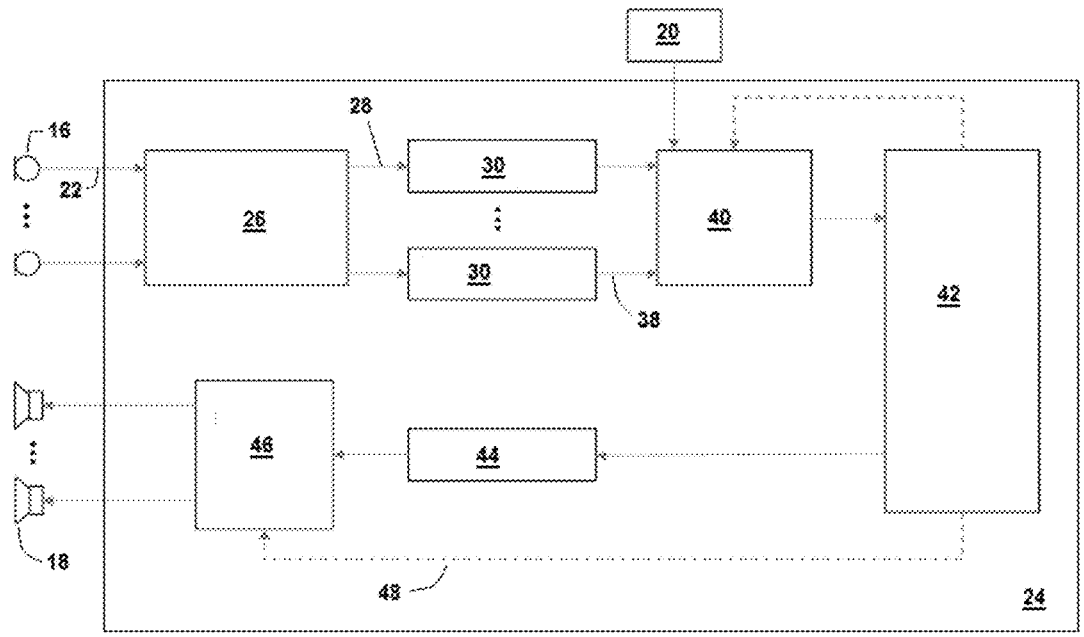
FIG. 2 shows further details of the automotive assistant shown in FIG. 1.

FIG. 2 shows an embodiment in which the reasoning stage 40 relies in part on input provided by the camera 20 in its effort to identify speech that is relevant to the ongoing dialog being carried out by the dialog manager 42. The camera 20 provides information from which gestures and gazes of passengers can be detected. For each passenger 12, the gestures and gazes of that passenger 12 offer valuable clues concerning whether that passenger's utterance is intended to further an ongoing dialog. For instance, it is useful to know if the passenger 12 also looked at a display from which various options associated with an ongoing dialog have been displayed. In other examples, it is useful to know whether the passenger 12 has made a significant gesture. For instance, a passenger's pointed finger is highly significant for inferring context.

In some embodiments, the reasoning stage 40 also relies on the dialog's state as a basis for whether or not a particular analysis output 28 is relevant to an ongoing dialog. The reasoning stage 40 receives information on the dialog's state directly from the dialog manager 42.

Also shown in FIG. 2 is a communication path between the dialog manager 42 and the loudspeakers 18. This communication path features a text-to-speech converter 44 and a distributor 46 that distributes signals to appropriate ones of the loudspeakers 18 based on a distribution signal 48 provided by the dialog manager 42.

The dialog manager 42 divides an ongoing dialog into steps. A typical step includes having the dialog manager 42 process the intrinsic speaker's utterance and then having the dialog manager 42 prepare a response.

In some cases, the response takes the form of a speech prompt that is provided to the text-to-speech converter 40 and ultimately distributed to one or more relevant loudspeakers 18. Alternatively, the response takes the form of an acoustic signal other than speech, such as a jingle or beep, that is then distributed to relevant loudspeakers 18.

However, in other cases, the dialog manager's response takes the form of a visual output. In such cases, the automotive assistant 24 communicates via a suitable human-machine interface, such as a display screen or lights in the vehicle 10.

In response to an utterance, the dialog manager 42 carries out any of a variety of actions. In some cases, the dialog manager 42 attempts to recognize the speaker's intent. In some cases, this requires clarification. In such cases, the dialog manager 42 poses clarifying questions. In other cases, the dialog manager 42, having recognized the speaker's intent, carries out an action consistent with that intent. Such actions include dialing a specific contact on a telephone, setting a particular destination, answering questions using an online database, or any other action that a virtual assistant would be expected to be able to carry out. Depending on the speaker's intent and the dialog's state, the dialog manager 42 provides feedback to all passengers or only to a subset of one or more passengers.

The manner in which the automotive assistant 24 is activated varies among embodiments. In some embodiments, the speaker uses a wake word or phrase. In others, the automotive assistant 24 relies on a signal from a push-to-talk button or a call button. In further embodiments, the speaker activates the automotive assistant 24 using a special command from a set of one or more such commands. Such a set includes a subset of those available to an automatic speech-recognition unit. In other embodiments, the automotive assistant 24 listens for any system-directed speech utterance.

Figure 3:
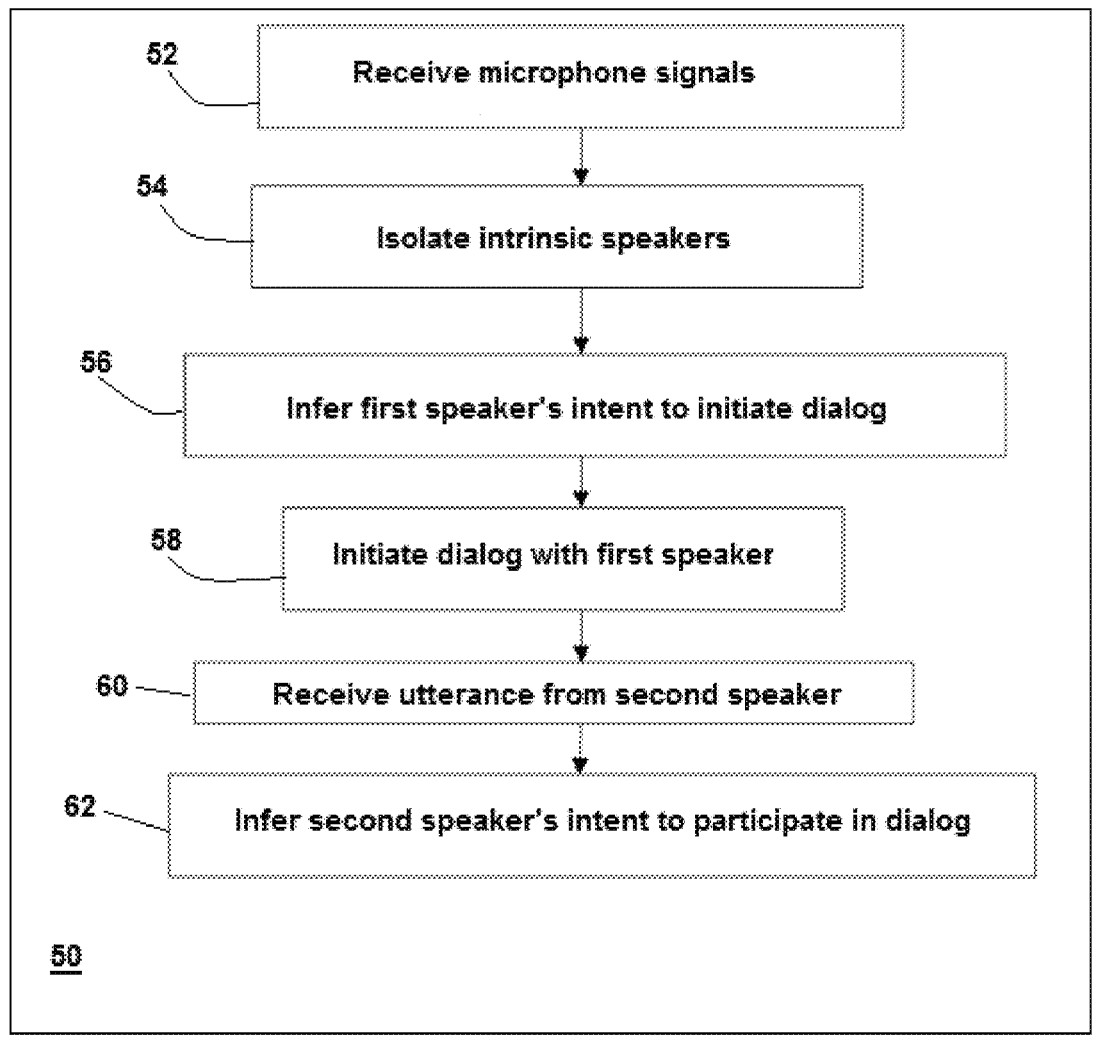
FIG. 3 is a flowchart illustrating the processing performed by the speech dialog system.

FIG. 3 provides an overview of a process 50 carried out by the automotive assistant 24. The process 50 begins with receiving microphone signals 22 from the various microphones 16 (step 52). For each such microphone signal 22, the automotive assistant isolates the intrinsic speaker for the acoustic zone associated with that microphone 16, thus generating acoustic signals 28 (step 54).

Upon detecting an utterance by a first passenger 12, the automotive assistant 24 determines whether that first passenger 12 is attempting to initiate a dialog with the automotive assistant (step 56). If the automotive assistant 24 infers that such an intent exists, it causes the dialog manager 42 to initiate a dialog with that passenger 12 (step 58). In some embodiments, this includes such actions as sending an audible acoustic punctuation, such as a beep or some other special prompt through the loudspeaker 18. In other embodiments, the prompt includes muting or lowering the volume of whatever else might already be being played through the loudspeaker 18, such as music or other acoustic forms of entertainment.

In the course of this now ongoing dialog, another passenger may speak. The automotive assistant 24 receives an utterance by this other passenger (step 60). That passenger's utterance might, of course, have nothing to do with the ongoing dialog. But in some cases, that passenger may wish to participate in the dialog. To distinguish between these cases, the automotive assistant 24 examines the utterance and, in some cases, infers that this second passenger in fact wishes to participate in the ongoing dialog (step 62).

In one example of operation, the automotive assistant 24 receives the first utterance having a command, such as "Plot a route to the Suds-and-Gristle at the mall" followed shortly thereafter by another passenger who utters, "Let's stop by the Corbett's pharmacy along the way for some hand sanitizer." In response, the automotive assistant 24 provides acknowledgement prompts for each of the first two utterances and displays a route to the destination, i.e., the Suds-and-Gristle, with a waypoint at Corbett's pharmacy.

After a short pause, a third passenger says, "Don't forget, we still have to pick up Glinda at the bus depot."

The automotive assistant 24 recognizes the similarity in context between this third utterance and the ongoing dialog. As such, the automotive assistant 24 infers that this utterance is an attempt to participate in the ongoing dialog. Therefore, in response, the automotive assistant 24 updates the displayed map with a second waypoint marking the bus depot.

In some embodiments, the automotive assistant 24 also realizes that the third passenger was the intrinsic speaker for a microphone 16 located in the back seat and therefore cannot see the map. As a result, the automotive assistant 24 provides a visual indicator that is visible from the rear seat and that indicates that the third passenger's utterance has been recognized and processed. As an example, the automotive assistant 24 may cause illumination of a light that is visible to the third passenger.

Figure 4:
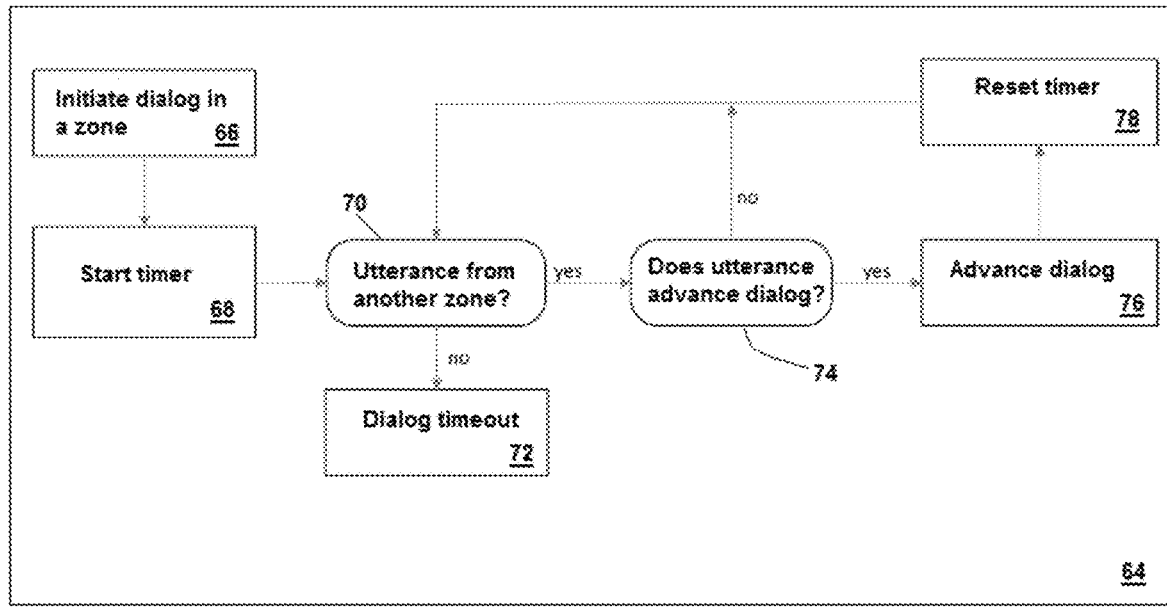
FIG. 4 is a flowchart illustrating a timeout protocol used by the speech dialog system, for use with a single running dialog.

FIG. 4 shows a process 64 that uses a timer to terminate a period during which a dialog can be updated. The process 64 begins with initiating a dialog with a speaker at a starting zone (step 66) and starting a timer (step 68). This results from having detected a wake-up-word or other activation phrase in the relevant zone. The natural-language processors 36 from all zones are then fully activated.

The process 64 continues with check to see if an utterance has been detected from a zone that differs from that in which the dialog was initiated (step 70). In some embodiments, the process 64 includes the starting zone in this check. If the timer has timed out, the dialog is terminated (step 72). Otherwise, the reasoning stage 40 determines whether the utterance is one that advances the dialog or on that is extraneous (step 74). In the latter case, the process 64 returns to the step of seeing whether an utterance has been detected (step 70). Otherwise, the reasoning stage 40 causes the dialog manager 42 to advance the dialog (step 76) and to reset the timer (step 78).

In some cases, an utterance that is extraneous to an ongoing dialog turns out to be an attempt to initiate a new dialog. In this case, the dialog manager 42 initiates a second dialog and manages the resulting first and second parallel dialogs. In such an embodiment, the dialog manager 42 handles the first and second dialogs in the same way. Thus, the process 64 shown in FIG. 4 can be carried out separately for each dialog. However, with two parallel dialogs, it becomes necessary to determine whether a detected utterance that is extraneous to the first dialog is nevertheless relevant to the second dialog.

Figure 5:
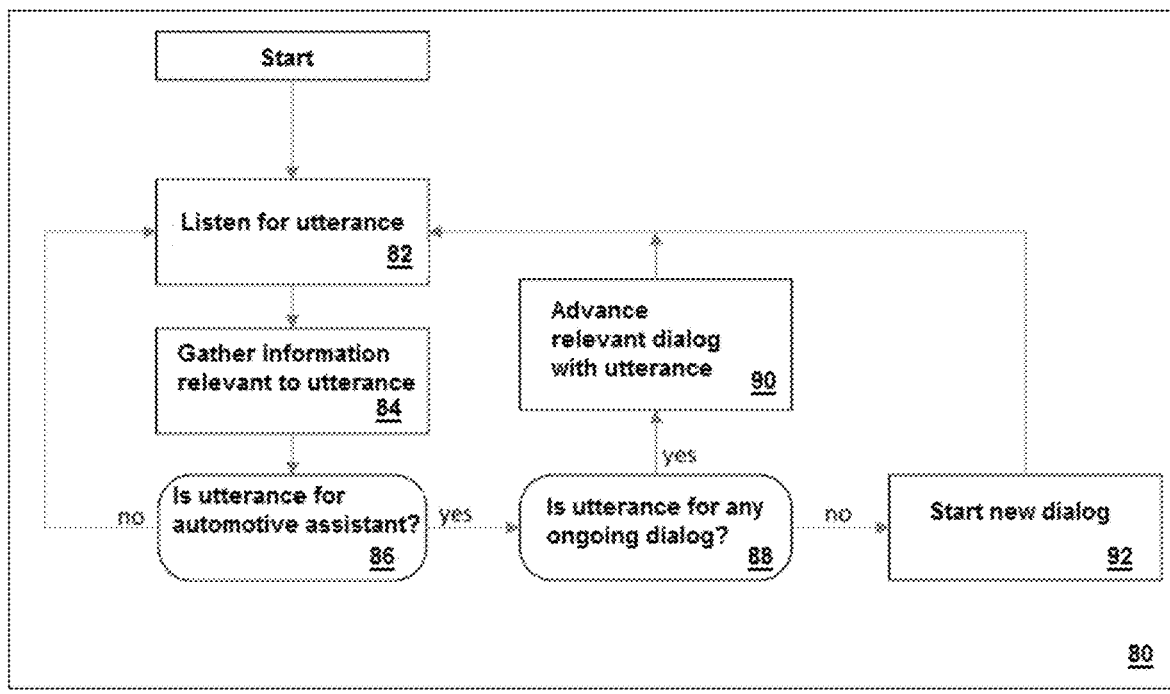
FIG. 5 is a flowchart illustrating the use of automatic speech-recognition for one or more running dialogs.

A process 80 shown in FIG. 5 for managing parallel dialogs includes listening for an utterance that originates at any one of the acoustic zones (step 82) and gathering information that promotes the ability to classify that utterance (step 84). Examples of such information include the word sequence, the particular microphone from which the utterance originated, and timing of the utterance relative to previous utterances.

Upon obtaining this information, it is possible to determine whether the utterance is directed towards the automotive assistant or not (step 86). If the utterance is not directed towards the automotive assistant, the process 80 returns to the step of listening for an utterance (step 82). On the other hand, if the utterance is, in fact, directed to the automotive assistant, it is useful to determine whether it is relevant to any ongoing dialog or if it is an attempt to initiate a new dialog (step 88). If the utterance is intended to advance an existing dialog, the process 80 continues with using that utterance to advance that dialog (step 90). On the other hand, if the utterance is intended to initiate a new dialog, the process 80 continues with initiating a new dialog (step 92). In both cases, these steps are followed by returning to the step of listening for an utterance (step 82).

It is to be understood that the foregoing description is intended to illustrate and not to limit the scope of the invention, which is defined by the scope of the appended claims. Other embodiments are within the scope of the following claims.

What is claimed is:

1. An apparatus comprising an automotive assistant that is configured to receive first and second microphone signals from first and second microphones disposed in corresponding first and second acoustic zones of a vehicle, wherein said first and second microphone signals carry first and second utterances from corresponding first and second passengers of said vehicle, wherein said automotive assistant comprises a dialog manager that is configured to initiate a dialog with said first passenger based on said first utterance and to advance said dialog based on said second utterance, said apparatus further comprising an isolator configured to receive a microphone signal from said first microphone, said microphone signal including a superposition of first and second utterances, said first utterance being an utterance from an intrinsic speaker for said first microphone and said second utterance being an utterance from an extrinsic speaker for said microphone, wherein said isolator is configured to output an acoustic signal corresponding to said microphone signal, wherein a first power ratio is a ratio of power in said first utterance relative to power in said second utterance in said microphone signal, wherein a second power ratio is a ratio of power in said first utterance to power in said second utterance in said acoustic signal, wherein said second power ratio and said first power ratio indicate that said second utterance has been suppressed in said acoustic signal.

2. The apparatus of claim 1, further comprising a reasoning stage that is configured to infer relevance of said second utterance to said dialog.

3. The apparatus of claim 1, wherein said dialog is a first dialog, wherein said apparatus further comprises a reasoning stage that is configured to infer whether said second utterance is intended to initiate a second dialog that differs from said first dialog.

4. The apparatus of claim 1, wherein said dialog is a first dialog and wherein said dialog manager is configured to manage said first dialog and a second dialog that is being carried out concurrently with said first dialog.

5. The apparatus of claim 1, further comprising a first speech daemon, and a second speech daemon, wherein said first speech daemon is configured to monitor a first acoustic signal, which is derived from said first microphone signal, wherein said second speech daemon is configured to monitor a second acoustic signal, which is derived from said second microphone signal, wherein said second speech daemon is configured to extract, from said second acoustic signal, information relevant to determining whether said second utterance is intended to advance said dialog.

6. The apparatus of claim 1, further comprising plural natural-language processors that are configured to execute while said dialog manager is managing said dialog, wherein each of said natural-language processors is configured to receive an acoustic signal derived from one of said microphones and to extract, from said acoustic signal, information indicative of relevance of said acoustic signal to said dialog.

7. The apparatus of claim 1, further comprising speech daemons, wherein each of said speech daemons is configured to monitor an acoustic signal derived from one of said microphones, wherein each of said speech daemons comprises a wake-word detector, a natural-language processor, and an automatic speech-recognizer.

8. The apparatus of claim 1, wherein said automotive assistant is further configured to receive first and second camera signals from first and second cameras disposed in said first and second acoustic zones respectively, wherein said automotive assistant is configured to determine relevance of said second utterance to said dialog based at least in part on information provided by said second camera.

9. The apparatus of claim 1, wherein said automotive assistant is connected to loudspeakers disposed in different acoustic zones respectively, wherein said dialog manager is configured to advance said dialog by providing a distribution signal that causes a loudspeaker signal to be provided to a proper subset of said loudspeakers.

10. The apparatus of claim 1, wherein said automotive assistant is configured to be pre-set to a state in which an utterance from one of said first and second microphones is ignored.

11. The apparatus of claim 1, wherein said automotive assistant is connected to loudspeakers, each of which is disposed in a different acoustic zone of said vehicle and wherein said apparatus further comprises a distributor that distributes a loudspeaker signal to selected ones of said loudspeakers.

12. The apparatus of claim 1, further comprising a first speech daemon and a remote natural-language processor, wherein said first speech daemon is configured to monitor an acoustic signal that is derived from said first microphone signal and to communicate a request to said remote natural-language processor for interpretation of a command in said first utterance.

13. The apparatus of claim 1, wherein each of said acoustic zones corresponds to a seat in said vehicle.

14. An apparatus comprising an automotive assistant that is configured to receive first and second microphone signals from first and second microphones disposed in corresponding first and second acoustic zones of a vehicle, said first and second acoustic zones corresponding to first and second seats in said vehicle, wherein said first and second microphone signals carry first and second utterances, respectively, from corresponding first and second passengers of said vehicle, wherein said automotive assistant comprises a dialog manager that is configured to initiate a dialog with said first passenger based on said first utterance and to advance said dialog based on said second utterance, said apparatus further comprising a reasoning stage, a first seat-specific speech daemon, and a second seat-specific speech daemon, wherein said first seat-specific speech daemon is configured to monitor a first acoustic signal, which is derived from said first microphone signal, which is in said first acoustic zone within said vehicle, wherein said second seat-specific speech daemon is configured to monitor a second acoustic signal, which is derived from said second microphone signal, which is in said second acoustic zone within said vehicle, wherein said second seat-specific speech daemon is configured to extract, from said second acoustic signal, information relevant to determining whether said second utterance is intended to advance said dialog and to provide said information to said reasoning stage, and wherein said reasoning stage is configured to receive said information from said second seat-specific speech daemon and to infer relevance of said second utterance to said dialog and to infer whether said second utterance is intended to initiate a new dialog.

15. The apparatus of claim 14, wherein each of said seat-specific speech daemons comprises a wake-word detector.

16. The apparatus of claim 14, wherein each of said seat-specific speech daemons comprises an automatic speech-recognizer.

17. The apparatus of claim 14, wherein each of said seat-specific speech daemons comprises a natural-language processor.

* * * * *